United States Patent
Barstad

[15] 3,665,198
[45] May 23, 1972

[54] AIRCRAFT LANDING GUIDANCE SYSTEM USING COLLIMATED FAN SHAPED RADIATION BEAMS

[72] Inventor: Gotfred E. B. Barstad, Kjeller, Lillestrom, Norway

[73] Assignee: Norwegian Defence Research Establishment, Kjeller, Norway

[22] Filed: Feb. 28, 1969

[21] Appl. No.: 805,109

Related U.S. Application Data

[63] Continuation-in-part of Ser. No. 449,220, Apr. 19, 1965, abandoned.

[52] U.S. Cl. ........................250/106 S, 250/83.3 R, 250/105, 250/106 VC, 343/101, 343/108
[51] Int. Cl. ..........................................G21h 5/00
[58] Field of Search ..................250/83.3 IR, 106 VC, 105; 343/101, 108, 111

[56] References Cited

UNITED STATES PATENTS

| | | | |
|---|---|---|---|
| 2,730,566 | 1/1956 | Bartow et al. | 250/105 X |
| 3,373,286 | 3/1968 | Han | 250/105 |
| 3,403,254 | 9/1968 | Campanella | 250/106 VC |
| 3,403,255 | 9/1968 | Campanella | 250/83.3 |
| 2,822,540 | 2/1958 | Butler | 343/108 |
| 2,944,151 | 7/1960 | Whitney et al. | 250/83.3 IR |
| 2,975,284 | 3/1961 | Osborne | 250/83.3 IR |
| 2,992,330 | 7/1961 | Cooper et al. | 250/106 VC |
| 3,004,258 | 10/1961 | Cohen et al. | 250/106 VC |
| 3,099,834 | 7/1963 | Sarbacher | 250/106 VC |

Primary Examiner—Archie R. Borchelt
Attorney—Sughrue, Rothwell, Mion, Zinn & Macpeak

[57] ABSTRACT

The identification of flight paths by means of forming plural coded groups of beams which intersect desired flight paths and define a corridor of flight. The beams are formed by pairs of radiation sources placed on opposite sides of the flight corridor, or by a single source under the corridor or to the side thereof. Each source is masked to form flat collimated diverging beams of radiation which are non-intersecting and which form a code group. The masks are configured so that each code group provides a different digital or analog code for each flight path. The digital code is provided by the presence or absence of beams at periodic distances along any flight path intersecting a different grouping or digital code of the code group. The analog code is provided by angularly positioning certain of the beams in a code group and having others the intersection of which is planes along the flight direction are parallel. With the distances between parallel beams as a reference, the distance along any flight path between a parallel beam and the angularly positioned beam is unique for each flight path within the flight corridor. By generating identical code groups positioned all along the corridor, an entire flight path to touchdown can be defined.

45 Claims, 27 Drawing Figures

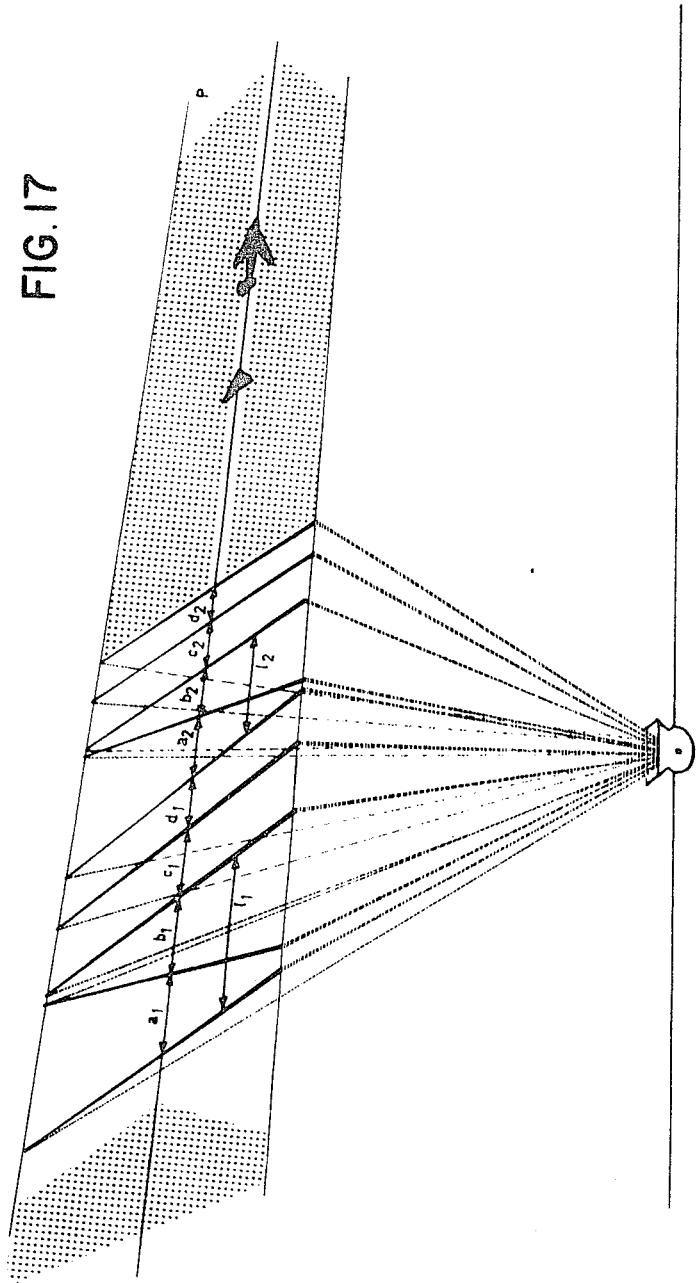

Patented May 23, 1972

INVENTOR
GOTFRED E. B. BARSTAD

BY Sughrue, Rothwell, Mion,
Zinn & Macpeak
ATTORNEYS

Patented May 23, 1972  3,665,198

INVENTOR
GOTFRED E. B. BARSTAD

BY  Sughrue, Rothwell, Mion,
Zinn & Macpeak

ATTORNEYS

INVENTOR
GOTFRED E. B. BARSTAD

BY Sughrue, Rothwell, Mion, Zinn & Macpeak

ATTORNEYS $S_1$ = SOURCES OF A FIRST TYPE OF RADIATION
$S_2$ = SOURCES OF A SECOND TYPE OF RADIATION

AIRCRAFT LANDING GUIDANCE SYSTEM USING COLLIMATED FAN SHAPED RADIATION BEAMS

CROSS REFERENCE TO RELATED APPLICATION

This application is a continuation-in-part of application Ser. No. 449,220, filed Apr. 19, 1965, now abandoned.

BACKGROUND OF THE INVENTION

1. Field of the Invention

It is possible by means of radio guiding systems of different kinds to guide an aircraft towards an airfield, but for the actual landing only manual procedures requiring good visibility have been authorized. The pilot must operate various controls in order to follow the flight path, and reduce the velocity etc. However, it is of great importance to be able to land an aircraft independent of the visibility conditions. This concerns civil air traffic as well as wartime and peacetime military operations, and has been a central problem for several years. Hitherto no system for complete blind landing or automatic landing has been authorized.

2. Description of the Prior Art

Suggestions of using penetrating rays (X- and gamma rays) from ray sources on the ground along the flight path have been made. Instruments detecting the radiation have been proposed fitted in the aircraft to determine its position and altitude. The principle of these systems is primarily to arrange the ray sources to radiate upwards for reception by a display system having a patterned assembly of radiation receivers, or a screen arrangement with an image converter. The object is to give the pilot a picture of the ray sources below the aircraft in order to indicate his position. The pilot shall also get an altitude indication by means of the intensity of the beam. This indication may only be approximate in practice, because it is dependent on the intensity of the ray sources, which decreases with time, if radioisotopes are used.

SUMMARY OF THE INVENTION

The object of the invention is to solve the said problem by using stationary radiation sources radiating collimated rays, the presence of which is detected by means of instruments in an aircraft. The width of the collimated beams and/or of the space between adjacent beams, measured in the flight direction in a sectional plane located tangentially to a flight path at a point in which said path is crossed by the radiation and contains a line perpendicular to the flight path, varies unequivocally in relation to displacement of the flight path through said line, to deliver, after detecting, signals varying with lateral deviation and altitude deviation of displaced flight path from the first mentioned flight path.

The widths, directions, flarings and spacings of the collimated beams are arranged so that an aircraft following a flight path in the radiation field can determine the deviation of its flight path from a desired one. (This may be considered as the perpendicular side deviation in a plane rotated about the correct flight path.)

A feature of the invention is that the radiation sources can be arranged as pairs with one source located on either side of a vertical plane containing the flight path. The rays can be collimated in such a way that in projection on a plane at right angle to the flight path and through both sources, the said radiation from two sources can be collimated to cover a substantially symmetric quadrilateral which defines an approach corridor.

Where a single radiation source is used to supply coded groups of radiation beams, each source is along a part of the corridor of flight or a part of the runway or taxiway. The logic of the single source system is similar to the logic of the paired source system with innovations in logic which give all the necessary information from one radiation source to a part of a flight operation. Further with sufficient numbers of radiation sources in one row (series) along the corridor of flight, runway and taxiway, an aircraft will, by detecting and decoding the beam pattern, get complete information for a safe landing or "take-off" operation. The single radiation sources can be sited either underneath or placed to one side or the other of the corridor of flight, runway and taxiway.

As in the paired source system the information to the aircraft will be derived by detecting and decoding from the three-dimensional geometry of the coded groups of radiation beams which forms a pattern of beams.

The radiation beams can be formed by masking means or radiation directors on each radiation source. The radiation source will emit gamma rays; X-rays; electromagnetic rays within the optical spectrum, such as ultraviolet, visual rays and infrared rays; or short wavelength radiowaves, preferably microwaves. Lasers can be used within the optical spectrum and masers within the short wavelength radio spectrum.

The landing system, according to the invention, is based on rays from sources outside the aircraft, primarily on or near the ground. The rays are collimated to form three-dimensional radiation patterns containing desired flight paths. During its approach, an aircraft with special instruments can, for example, constantly be informed of its position and the deviation of its flight path from a desired flight path.

More specifically, an aircraft can decide its velocity relative to the ground, as well as the direction and angle of its flight path with the ground by means of the radiation received. Detectors in the aircraft will detect the presence of the beams, and electronic "decoding" equipment in the aircraft will be used to give such information as the distance to the runway, aircraft altitude, relative lateral and altitude deviation from a desired flight path, which may be at about the center of the approach corridor defined by the radiation patterns. This information may for example be transferred to a visual display for the guidance of the pilot and/or to auto-pilots for automatic landing. The aircraft may also be equipped with detectors for detecting only the presence of gamma rays without any decoding equipment. When an aircraft passes a gamma radiation field, a radio signal could be transmitted to the flight control on the airfield, where decoding equipment could interpret the radiation signals for guiding the aircraft down by radio instructions from the ground either manually or automatically.

BRIEF DESCRIPTION OF THE DRAWINGS

The invention is to be explained with reference to the drawings, in which:

FIG. 14a is a diagrammatic horizontal section of FIG. 14.

FIG. 15a is a diagrammatic horizontal section taken through FIG. 15.

FIG. 17 is a diagrammatic perspective view of the flight corridor established by a single source.

DETAILED DESCRIPTION OF THE INVENTION

Figure 1:
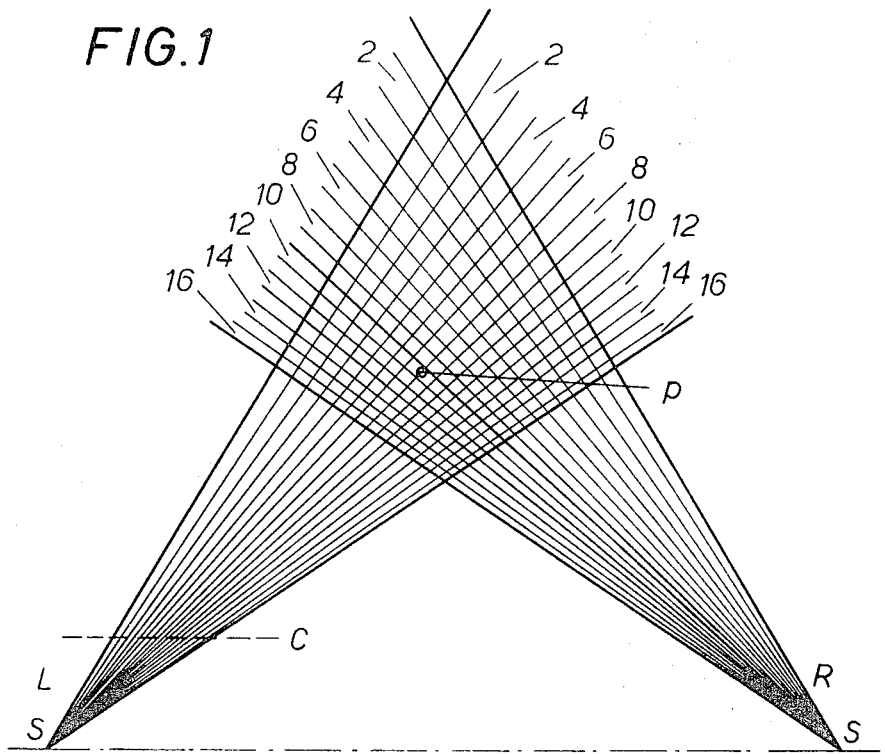
FIG. 1 shows a section through a specimen radiation pattern from a pair of sources in a plane perpendicular to the desired flight path.
Figure 2:
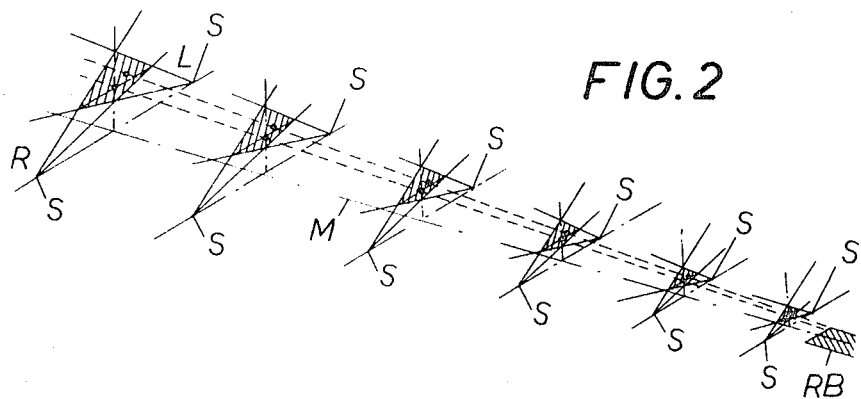
FIG. 2 shows in perspective a number of pairs of radiation sources together defining a flight corridor leading to the landing point on the runway.

In FIGS. 1 and 2 is shown how a flight corridor is defined by pairs of radiation sources S located one on either side of said corridor. FIG. 1 shows a section perpendicular to the flight path, the right and left sides being indicated by R and L respectively. Each radiation source S is provided with a collimator C which is to be described below and which is only indicated diagrammatically by a dotted line in FIG. 1. By means of such collimators which produce fans of beams of gamma radiation, an aircraft is able to sense an approach corridor of quadrilateral or other cross-section. In the arrangement shown in FIG. 1, each fan consists of 16 sectors perpendicular to the desired flight path, so that information corresponding to 16 × 16 = 256 channels is available for guidance purposes in the approach corridor.

Figure 20:
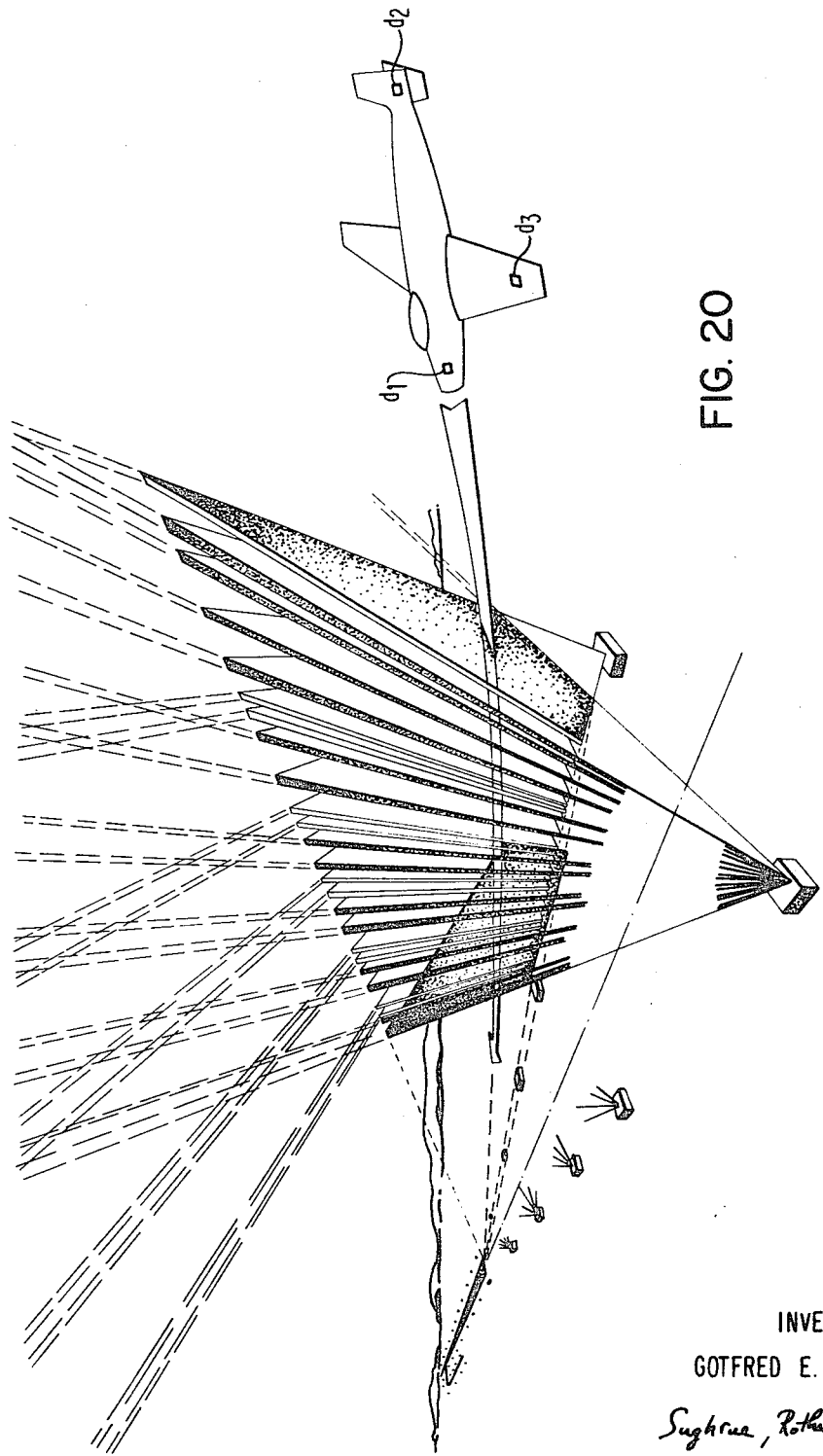
FIG. 20 is a perspective view of the flight corridor established by the system of pairs of sources with runway and one aircraft approaching.

FIG. 20 is a perspective view of the flight corridor established by the system of pairs of sources with a runway and one aircraft approaching.

FIG. 2 shows diagrammatically the last six pairs of radiation sources defining a gradually narrowing flight corridor, the sources of each pair being arranged gradually closer to a central line M on the ground, which is the horizontal projection of the mean line of the corridor (the line connecting crossing points between the diagonals of each quadrilateral.) The beam pattern of the guidance system can be arranged as required towards and along the airfield runway to provide the information needed for flare out and touch down.

Two flight paths have been indicated by dotted lines in FIG. 2, one of which is located along the intersections of the lines joining opposite corners of the quadrilaterals. The other illustrates an arbitrary flight path inside the approach corridor. Since the radiation sources S are arranged gradually closer to the central line M in a direction towards the runway RB, the strength of the sources may conveniently be decreased towards the point of landing while at the same time having stronger radiation intensities near the point of landing than further out in the approach corridor.

Figure 3:
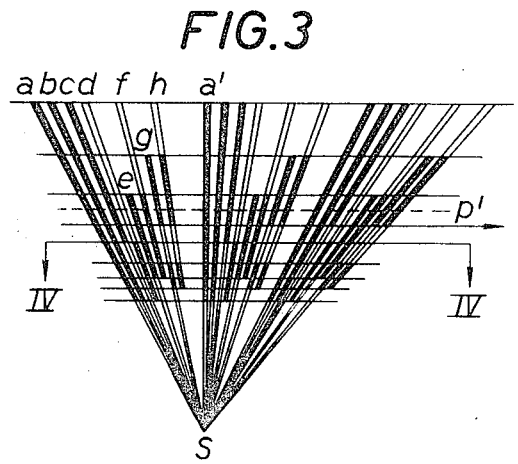
FIG. 3 illustrates a sample radiation pattern from a pair of radiation sources as seen in a vertical plane containing the flight path.
Figures 4, 5:
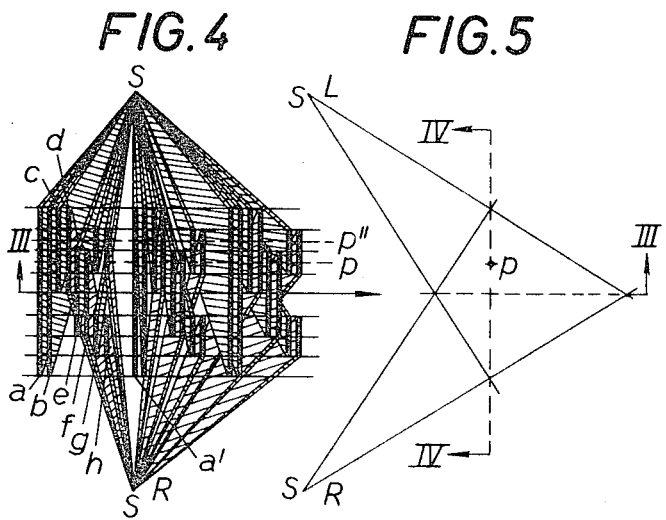
FIG. 4 shows the same seen in a horizontal section containing the flight path.
FIG. 5 shows the same diagrammatically in cross section.

The radiation pattern as illustrated in FIG. 1 could be a "binary coding" of the radiation pattern produced by collimators giving beam patterns according to FIGS. 3 and 4, the first of which shows a vertical section along the mean line of the corridor, and the second a corresponding horizontal section along the mean line. The collimators of both sources form "flat" radiation beams giving a radiation pattern of the kind illustrated in FIG. 1, which however only uses 8 × 8 = 64 channels for the approach corridor.

This form of radiation pattern represents a special type of binary code, which for the beams from a single source is the so-called Gray code. The principle of coding may be explained therefrom.

In the example the signals which an aircraft receives during its flight through the corridor consist of in all six elements or bits, each element or bit being represented by the presence (1) or non-presence (0) of a beam in a predetermined position. Three bits are obtained from each of the two radiation sources forming a pair located one on either side of the mean line M. Three bits gives the possibility of eight combinations (presence or non-presence of beams), and, thus, eight sectors of beams emanating from their apex and each having their own code. Consequently, the two radiation sources of a pair of sources will define together 8 × 8 = 64 channels or flight paths within the corridor when the signals are repeated in the flight direction. Two additional beams are arranged in front of each signal in distances equal to the distances between the positions for the radiation (beams or no beams) to give the unit of measure (dimension or scale value) of the signals.

The beams from each source in a pair of sources are of equal dimensions at the same altitude, but radiate at different angles. In the example shown in FIG. 4 the two elements (radiation beams) a and b give the unit of measure (reference beams) and the next three pairs of signal elements c, d and e, f and g, h respectively then define the channels.

An aircraft located, for instance, in channel p, FIGS. 4 and 5, will thus be influenced by the first two and all the six signal elements of each signal, i.e. 1, 1; 1, 1, 1, 1, 1, 1, which code designates channel p unequivocally. Similarly, another channel, such as p' in FIG. 3, will be designated by the code 1, 1; 1, 0, 1, 1, 1, 1, and channel p'' in FIG. 4 by the code 1, 1; 1, 1, 0, 0, 1, 1.

The information can be detected by radiation sensitive instruments and may for example be transformed to give visible indications to provide guidance for the aircraft pilot.

When the aircraft is approaching an airfield through the corridor, the distance between the additional rays a, b is a measure of the distance between the following ray positions and, thus, of the frequency of the ray signals (the scale of signals). The detector equipment can detect and indicate the presence or non-presence of rays in the actual position of the channel or flight path which the aircraft is following. This can be repeated along the flight path until the landing point at the runway RB.

The signals are repeated at short intervals depending on the design of the collimators and the relative positions of the pairs of radiation sources.

Between two pairs of radiation sources there may be arranged other pairs, which, by means of suitable collimators, provide "non-diverging" parallel beams, i.e. beams, the corresponding side boundaries of which do not spread out fan-wise relative to each other. It is also possible to obtain these beams from the same pair of sources from which the other beams emanate, one from each source. If A is the distance between the "non-diverging" beams as measured in the flight direction, and T is the time for passing between the first and second "non-diverging" beams, the speed relative to the earth (the ground speed) is given by the expression A/T.

By means of two such "non-diverging" beams it is possible to obtain the absolute ground speed as a basis for calculating the altitude of the aircraft within the corridor. This information together with the previously mentioned information about the relative position in the corridor (the lateral deviation and altitude deviation from the middle line of the corridor) indicates unequivocally the absolute position of the aircraft in the corridor, or with other words the actual flight path. The altitude may be calculated by comparing the time for passing two "non-diverging" beams during the flight, i.e. a determination of the absolute speed of the aircraft, with the time for passing between two of the diverging radiation beams, such as a and b (see FIG. 4) or two corresponding beams such as $a$ and $a'$.

As illustrated, an aircraft will cross several groups of signal elements when passing a pair of radiation sources, the frequency of the signals received at a given ground speed being inversely proportional to altitude; in other words, the signal period is proportional to the altitude. The ground speed can thus be multiplied by the signal period and a constant coefficient to obtain the absolute altitude.

Figure 6:
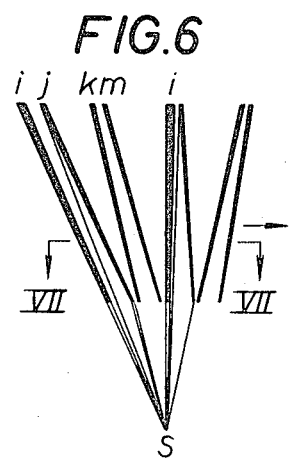
FIGS. 6 and 7 illustrate an alternative radiation pattern.
Figure 7:
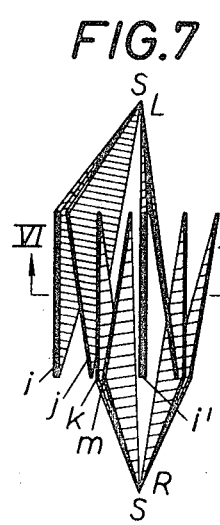

In a system as shown in FIGS. 3 and 4 it will only be possible to obtain information about which particular channel (for example one of 256 or one of 64) the aircraft is flying in, but nothing about the exact place within the channel. Apart from this, the arrangement discussed requires relatively complicated collimators. An alternative system is shown in FIGS. 6 and 7, corresponding to FIGS. 3 and 4. FIGS. 6 and 7 show two signals, each consisting of signal elements $i, j, k, m$, formed by collimation of the right and left radiation sources S. In this case the first signal element i and the third signal element $k$ are references together with the inclined, "flat" radiation beams $j$ and $m$ telling the pilot where he is in relation to the line in which the vertical and horizontal planes through the diagonals cross each other, by comparing the time of flight between the different signal elements. Examples from a modified system are explained in the following.

Figure 8:
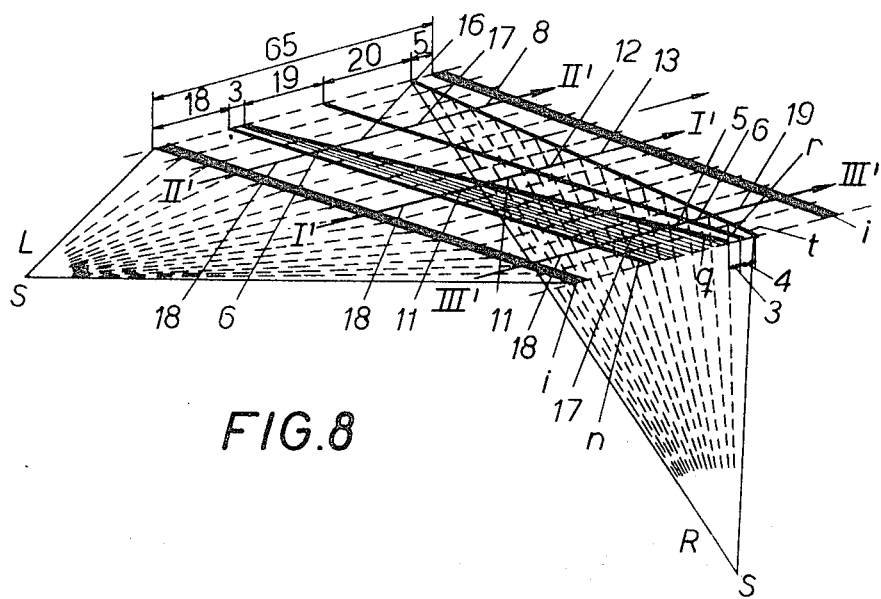
FIG. 8 is an enlarged perspective illustration of a similar radiation pattern.

FIG. 8 shows as an example how the radiation pattern may be used, i.e. the codes obtained thereby. In this case the radiation pattern consists of five "flat" radiation beams or signal elements of which $i, n$ and $r$ are located at right angles to the flight path or the mean axis of the corridor, and $q$ and $t$ each form acute angles with the first mentioned beams. The signals elements $i, n$ and $q$ emerge from the left source and r and t from the right source. The first signal element in the next set of radiation beams which give the same radiation pattern as the first signals is designated $i'$. Beams $i, n, q, r$ and $t$ form together the first signal which, including the distance between the last element t of the first signal and the first element $i'$ of the second signal, covers a corridor length of 65 units or bits, the mutual distances at the outer left side corresponding with 18, 3, 19, 20 and 5 bits respectively, and at the outer right side correspond with 18, 19, 3, 4 and 21 bits respectively. The relative time difference in bits between the signal elements indicates the position of the aircraft in the approach corridor.

If the aircraft is flying in the sectional plane shown in FIG. 8 and follows the path I', it will receive signals with the time intervals 18, 11, 11, 12, 13, giving an unequivocal designation of the flight path. If the aircraft follows paths II' or III', it will receive signals with time intervals 18, 6, 16, 17, 8 or 18, 17, 5, 6, 19, which also give unequivocal representation of the flight paths.

If the aircraft flies higher or lower within the corridor, the time intervals will be different, for example 18, 6, 16, 6, 19, in which case the path is located above the horizontal sectional plane in FIG. 5 and the line of intersection between adjacent inclined planes which may be designated II'' and III'', i.e. II'' is the plane containing the left radiation source and the course II' (flight path), and III'' is the plane containing the right source and the course III'. The higher flight path is then uniquely defined.

The radiation pattern may also be regarded otherwise. As mentioned, the sectional plane in FIG. 8 located in the direction of the flight, which intersect the beams so that the sections of beams $i, n$ and $r$ in said plane are parallel, and $q$ and $t$ each form acute angles with the first mentioned beams. The beams $i, n$ and $r$ may be termed reference beams, and $q$ and $t$ information beams.

Along an arbitrarily chosen flight path, such as I', in which the time interval between $i$ and $n$ is 18 and between $n$ and $q$ is 11, the relation between the two time intervals, i.e. 11/18, indicates the angular direction to the aircraft as seen from the left radiation source LS. The same value is obtained for all flight paths having the same time relation. Consequently, the time relation is a measure of the angle to the aircraft passing $q$ from LS in the code used. Similarly, the time relation between $i$ and $n$, which is 18, compared with the time relation between $r$ and $t$, which is 12, gives a measure of the direction of the aircraft from RS when passing $t$ (namely 12/18).

Figure 9:
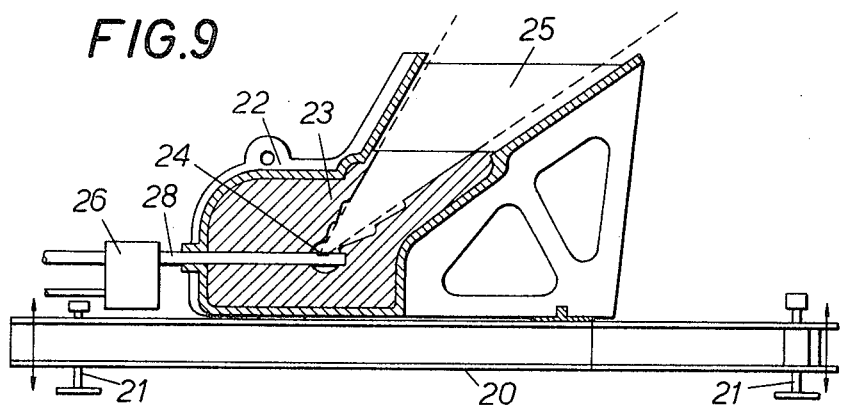
FIGS. 9 and 10 show a collimator in longitudinal section and seen from above respectively.
Figure 10:
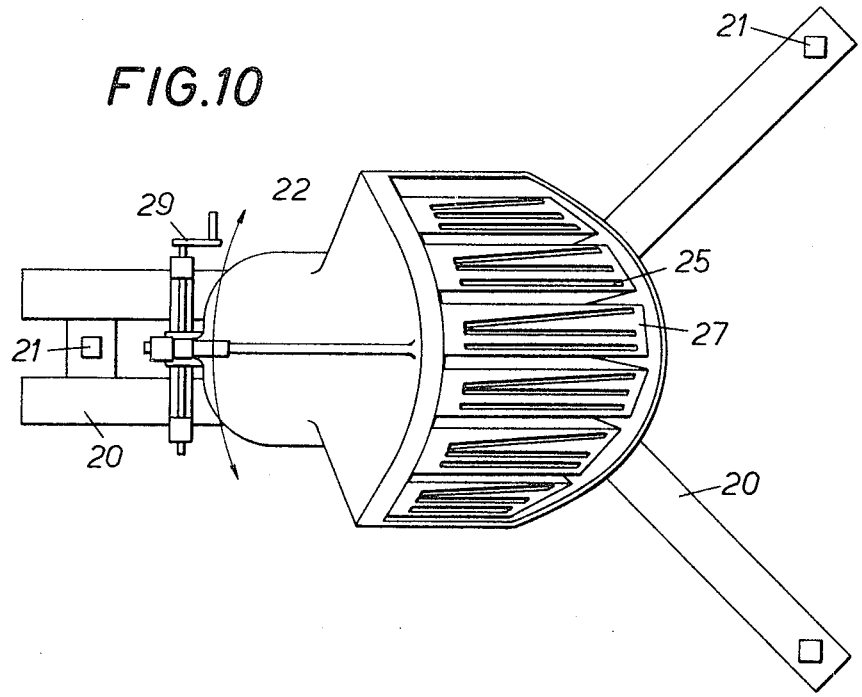

A collimator arrangement is illustrated in FIGS. 9 and 10, of which FIG. 9 is a vertical section. The collimator has a support 20 with three screws 21 for adjustment. A collimator housing or base 22, which is attached to the support, defines a slantwise opening for emission of radiation from a radiation source 24. The source is located in the middle of a lead shield 23 located within the housing 22. Collimator elements 27 having slots 25 limit the radiation to a certain pattern of beams. The arrangement illustrated produces a pattern of "flat" radiation beams $i, n$ and $q$ shown in FIG. 8 as emanating from the left source. The right radiation source is located in a collimator, the bodies 27 of which give two radiation beams $r$ and $t$.

In the example chosen the radiation source 24 is a radioactive element placed in a recess in a rod 28 near its end. Rod 28 is introduced through a bore in the shield 23 and kept in place by means of holder 26. A screw spindle 29 serves to adjust the collimator for correct orientation of the radiation beams.

Figure 11:
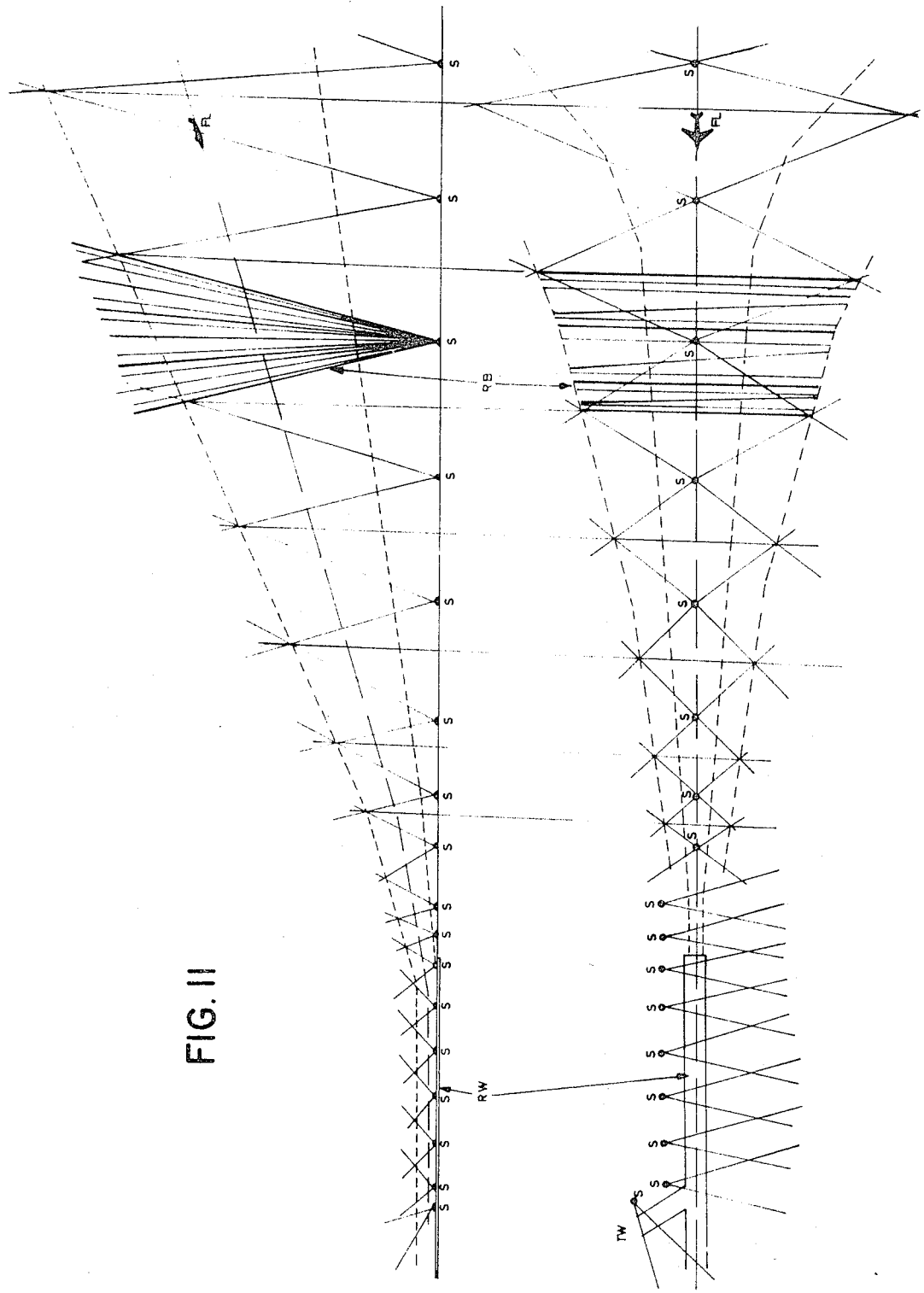
FIG. 11 is a diagrammatic outline of the modification of the invention using a series of single sources.

FIGS. 11 through 17 are directed to a modification of the invention that utilizes a series of single sources of beams to be radiated in patterns along the flight corridor. As shown in FIG. 11, the radiation sources S are aligned along the flight corridor. These sources S send up a series of radiation beams RB which define patterns along the corridor. To facilitate recognition of the concept shown in this figure, a runway RW is shown with the taxiway TW leading thereoff, with an aircraft FL indicated as progressing on the flight path within the corridor.

Figure 21:
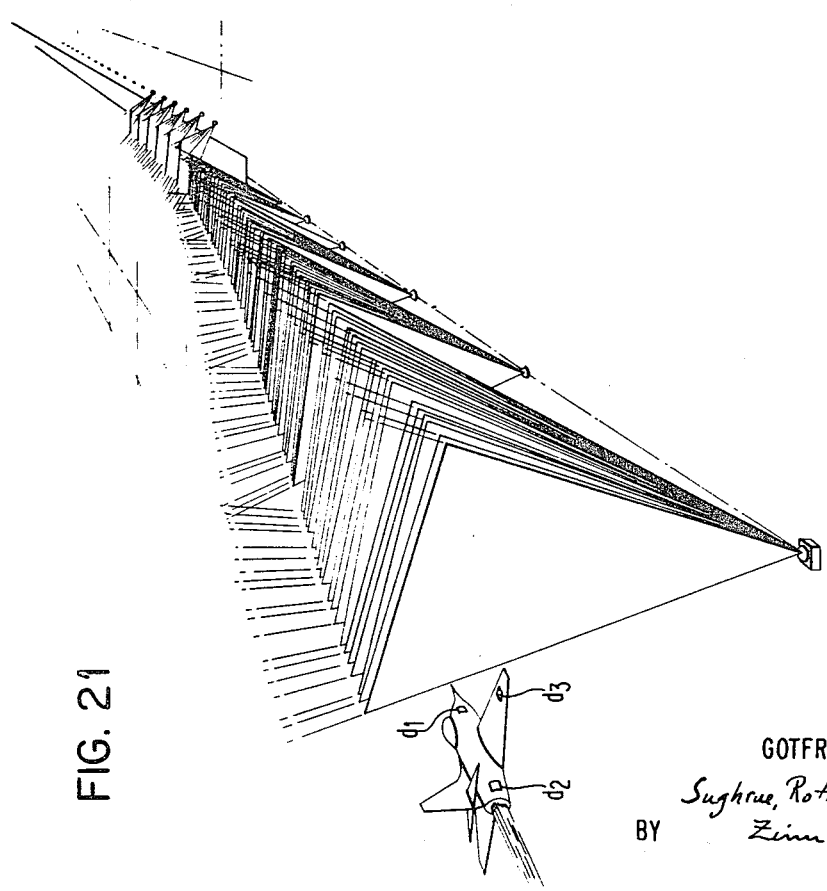
FIG. 21 is a perspective view of the flight corridor established by the system of single sources with runway and one aircraft approaching.

FIG. 21 is a perspective view of the flight corridor established by the system of single sources with runway and one aircraft approaching.

Figure 12B:
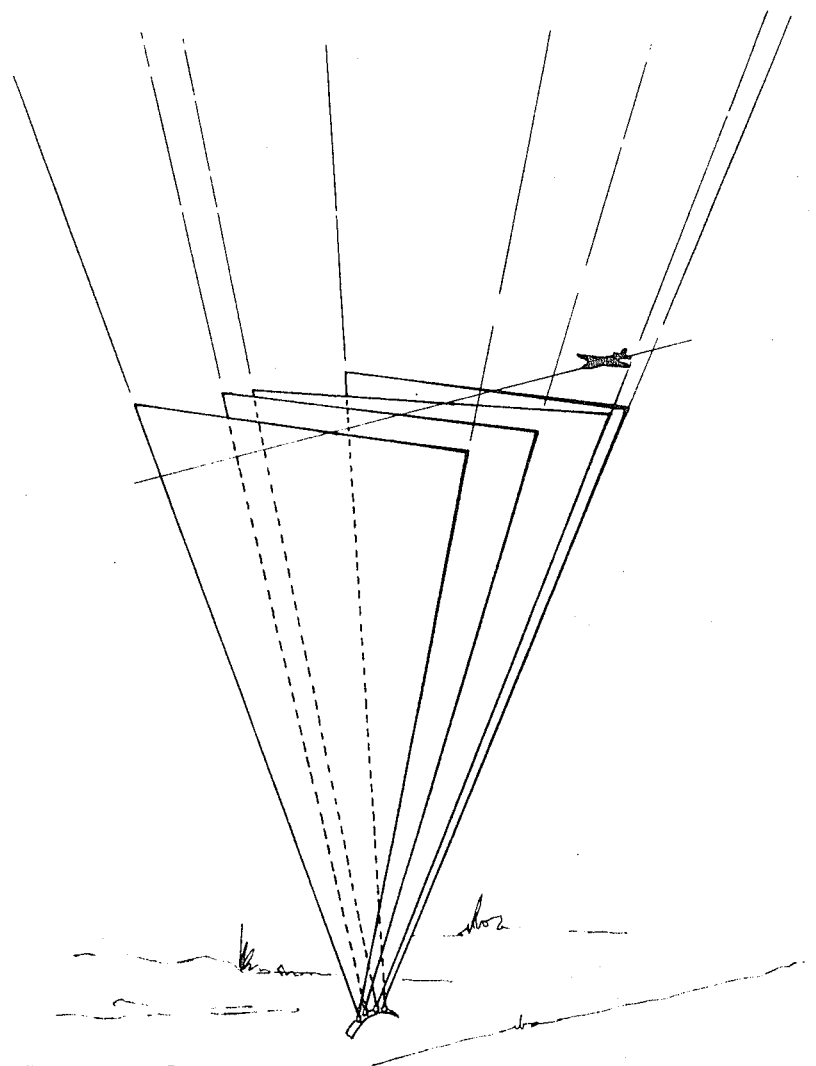
FIGS. 12a and 12b show the collimation and use of laser beams as the source.
Figure 12A:
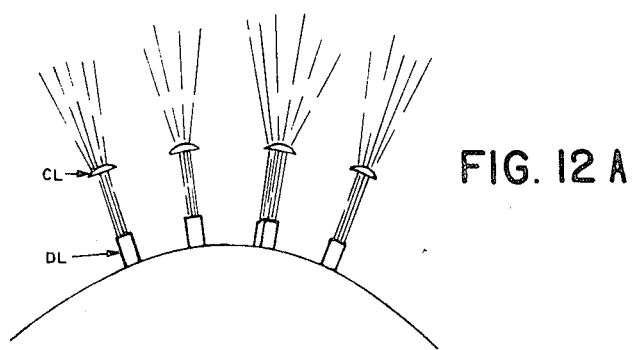
Figure 13:
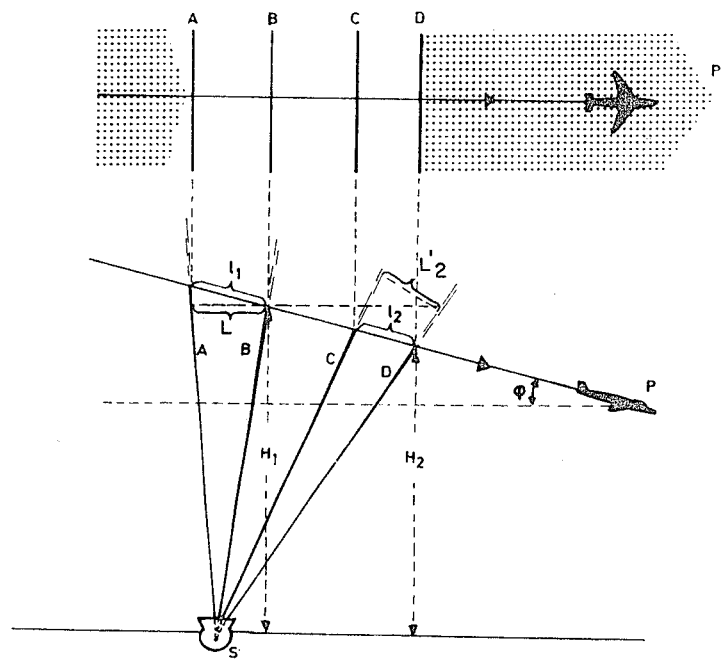
FIG. 13 is a diagrammatic side view of the radiation pattern of a single source showing the altitude of the plane.

The single source used in this embodiment of the invention may be a collimator arrangement and is illustrated in FIGS. 9 and 10, utilizing emission of radiation from a radiation source, or optical rays as dispersed by a laser may also be used as shown in FIGS. 12a and 12b. In FIG. 12a is shown a series of diodelasers DL arranged in a series with each diodelaser being the source for one beam. The laser diode can then be arranged to give the same radiation pattern as the gamma ray source, such as shown in FIGS. 9 and 10, with shielding masks. Since the radiation from one laser diode is mainly in one narrow beam, this beam can be transformed into beams diverging in one plane over to other shapes in accordance with the beam pattern desired by means of cylindrically formed lenses or other optical means CL. These means are generally known as radiation directors. The detectors in the aircraft will be able to detect the laser beams and discriminate against background radiation.

As can be seen from the utilization of the rays of the gamma ray system and the beams of the lasers, this invention would also lend itself to the utilization of X-rays and microwaves. The X-ray system would be much like the aforementioned gamma ray system in that each source would include equipment to generate X-rays. In utilizing the microwaves, a directional antenna system of conventional design could be arranged with the beams shaped to diverge in one plane or to any other shape according to the beam pattern desired.

As shown in FIG. 3 if "flat" diverging radiation beams are arranged transversely to the direction of flight, so that their intersection line with the flight path is horizontal (and therefore also their intersection lines with any horizontal plane will be parallel), then the distance between two such beams, measured along flight paths, will be proportional to the altitude above the source.

This relationship can be expressed for two given beams (a pair of beams $a$ and $b$ or $c$ and $d$) as:

$$H = k\, l$$

Where $l$ is the horizontal distance measured between two given beams along a particular flight path. $k$ is a constant for said beams, which depends on the angle between them and on the vectorial direction of the flight path. Assuming constant ground speed $V_g$ in the short time interval $t_1$ between the beams:

$$t_1 \cdot V_g = l \text{ and further:}$$
$$l = l_1 \cos\phi = l_2' \cos\phi$$

where $\phi$ is a glide slope angle and $l_1$ and $l_2'$ are distances measured at the same altitude (but not the same flight path) between two pair of beams arranged according to the supposition. For a flight path with glide slope angle $\phi$ we get, FIG. 13

$$H_1 = K l_1 \cos\phi = K V_g t_{1_1}$$
$$H_2 = K l_2 \cos\phi = K V_g t l_2$$

and then generally $H = K V_g t_l$

When the deviation of the glide slope angle is negligible or small, about a few degrees, then we also get approximately:

$$H = k\, V_g\, t_1 \text{ for these glide slopes.}$$

If further pairs of beams from the same source and from other sources are arranged in the same manner, so that the distance between any two of the beams measured along the same vectorial flight path direction satisfies the same altitude-distance relationship $H = k\, l$, then an aircraft, by measuring the time intervals $t_1$, will get repeated altitude determination through the computation:

$$H = k\, V_g\, t_1$$

If the intersection axis mentioned has another direction, for example vertical, the flight path distance D to a plane through the axis is found in the same manner by means of a similar expression:

$$D = k' V_g' t_1'$$

Figure 14:
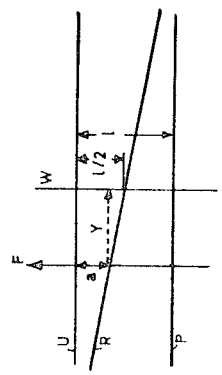
FIG. 14 is a diagrammatic perspective view through the radiation pattern of a single source in a plane perpendicular to the desired flight path, with the source located in the middle of flight corridor.
Figure 14:
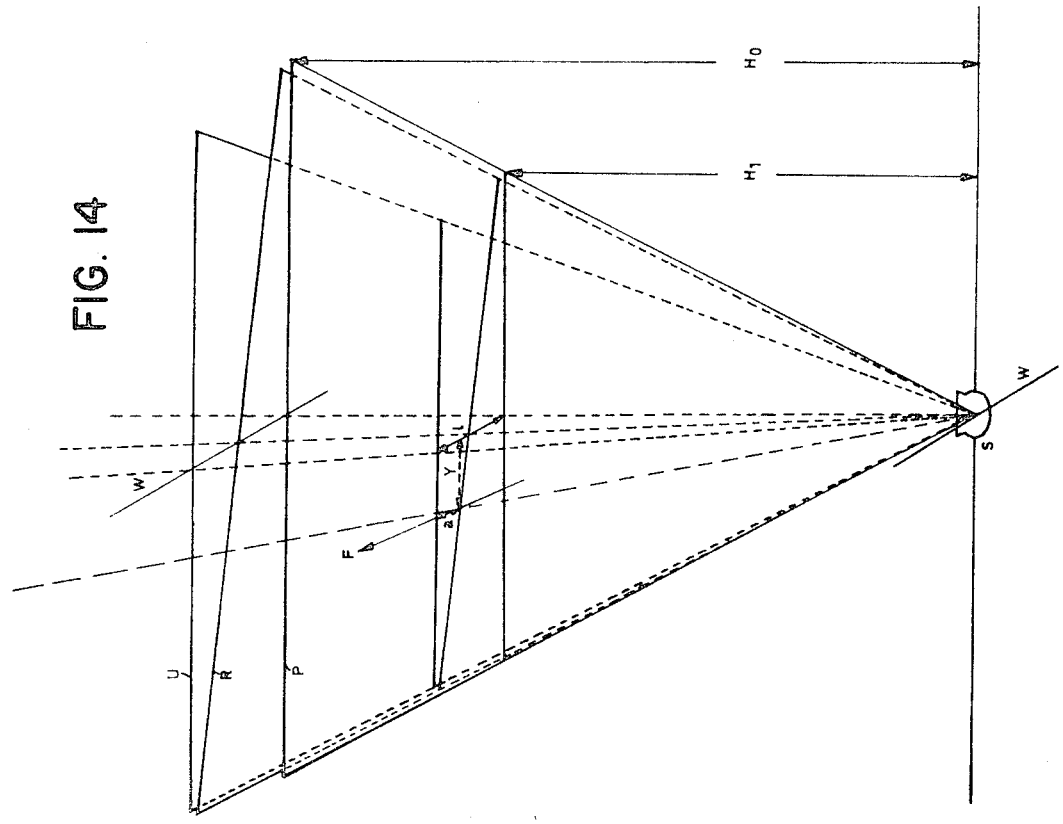
Figure 15:
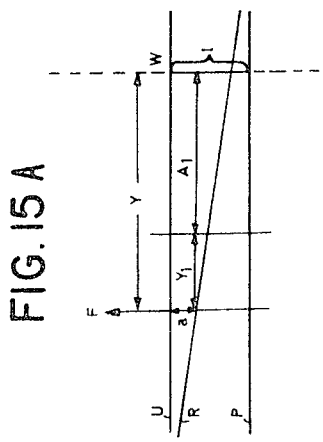
FIG. 15 is a diagrammatic perspective view taken through the radiation pattern of a single source in a plane perpendicular to the desired flight path, with the source located on one side of the flight corridor.
Figure 15:
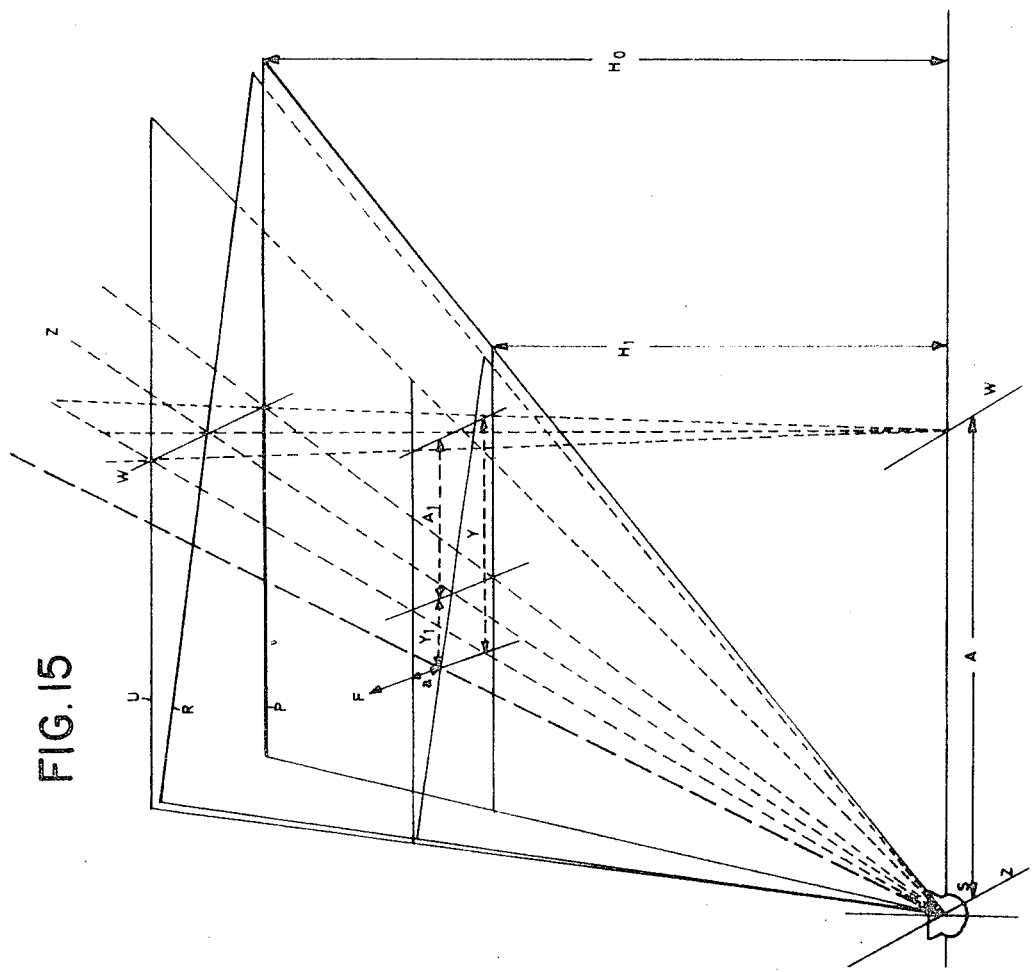

To obtain information about the lateral position of the path of an aircraft in relation to the corridor of flight, assume an arbitrary chosen flight path of an aircraft such as F in FIGS. 14 through 15a. The time interval between the passing of the plane through the beam P and the beam U is $t_1$, and between the beam R and the beam U is $t_a$, corresponding respectively to flight path element 1 and $a$. The beams P and U are parallel in a horizontal plane and the beam R is at an angle thereto. Then, the relation between the two time intervals $t_a/t_1$, assuming constant ground speed $V_g$, indicates the angular transverse displacement of the aircraft as seen from the radiation source S on the ground. The same angle is obtained for all flight paths having the same time relation or time quotient. Consequently the time quotient will be a lateral angular measure of the path of an aircraft in relation to the position of the source in the particular lay-out of the system.

In FIGS. 14 and 14a, wherein the source is placed on the ground in the center of the flight corridor, the lateral angular deviation of the flight path F from the vertical plane W, through the corridor central path, will be proportional to $(a/l - 1/2/l)$. Where $\frac{1}{2}/1 = \frac{1}{2}$ is the quotient of flight path elements for an aircraft passing along the plane W.

Since absolute position depends on the dimensions of the flight path elements, which are proportional to the altitude $H$, letting $Y$ be the lateral distance to the middle plane W, yields:

$$Y = K_2 \left(\frac{a}{1} - \frac{1}{2}\right) H$$

where $K_2$ is a constant.

Utilizing the relationship between $l$ and $H$:

$$H = K_1\, l$$

yields:

$$Y = K_2 \left(\frac{a}{1} - \frac{1}{2}\right) K_1 l$$

and with constant ground speed $V_g$:

$$Y = K_3 \left(\frac{t_a}{t_1} - \frac{1}{2}\right) V_g t_1$$

Where $K_3 = K_1 K_2$ for the given lay-out of the system and $Y$ is then an absolute measure (in feet, or meters) of the lateral displacement, measured as positive or negative, according to a chosen positive lateral direction.

In FIGS. 15 and 15a the radiation source is placed a horizontal distance A from the ground projection of the corridor center line which is at an altitude $H_0$. The middle flight path (where $a = \frac{1}{2}$) is in the middle plane W. Assuming a plane Z parallel to the flight direction through the source, and said middle flight path in said middle plane, $y_1$ is the distance in a horizontal plane from the arbitrary chosen flight path F at the altitude $H_1$ to said plane Z.

Using the same geometrical relationship as in FIGS. 14 and 14a above:

$$y_1 = K_3 \left(\frac{t_a}{t_1} - \frac{1}{2}\right) V_g t_1$$

At the altitude $H_1$, where the aircraft is flying, the lateral distance from said plane Z to the said middle plane W is $A_1$, and yields:

$$A_1 : A = (H_0 - H_1) : H_0$$

$$A_1 = \frac{(H_0 - H_1)A}{H_0} = \frac{(H_0 - K_1 V_g t_1)}{H_0} A$$

To get the lateral distance $Y$, from the said flight path F to said middle plane W, combine $$Y = y_1 + A_1 = K_3 \left(\frac{t_a}{t_1} - \frac{1}{2}\right) V_g t_1 + \frac{H_0 - K_1 V_g t_1}{H_0} A$$

Where $V_g$, $H_0$ and $A$ are given as particular information on passing of the particular radiation source S. $y_1$ and $A$ have positive or negative values depending upon chosen positive lateral direction, and $K_3$ and $K_1$ can be constants for a given particular lay-out of the system. By measuring the time intervals $t_a$ and $t_1$ the absolute lateral position can therefore be calculated.

By arranging the system so that the middle plane W is the same in the radiation pattern from all sources then the system will have a fixed middle plane as a reference plane and the lateral distance to any flight path from this middle plane can be computed. Through accurate measurement of lateral distance and altitude the position of the radiation detector in the aircraft can be obtained.

Figure 16:
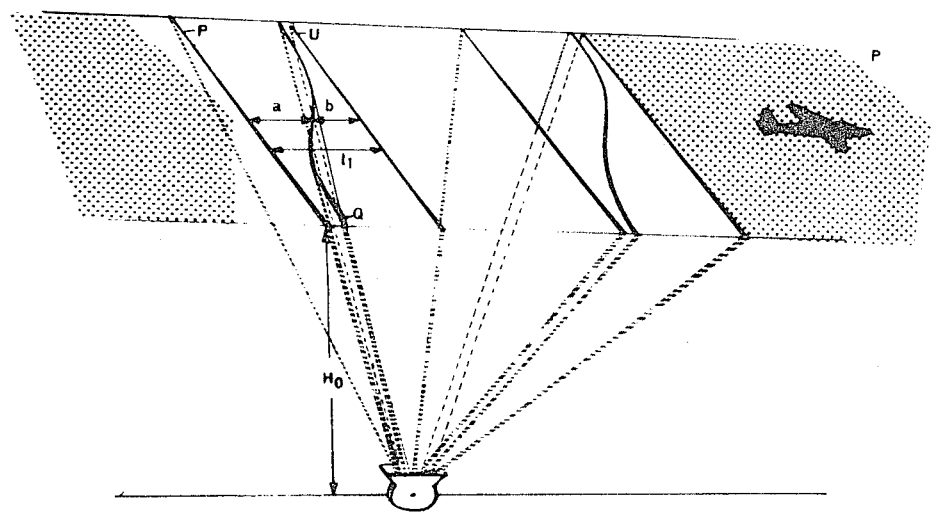
FIG. 16 is a modification of the radiation pattern of the single source shown in FIGS. 14 and 15.

The beam pattern in FIG. 16 is similar to those shown in FIGS. 14 through 15a wherein two diverging beams P and U are parallel in a given plane arranged substantially along the flight path. A third diverging beam Q, in the section through said given plane, generates a curved track in such a way that the flight path element between said three beams uniquely defines the angular position of said flight path in relation to the radiation source. Then, when knowing the position of the source and the function describing the curved track, the absolute lateral position of the flight path can be obtained through similar mathematical expressions as set forth hereinabove.

It is an advantage during approach and "take off" operations that the aircraft has available all necessary information with high accuracy along the flight corridor and on the runway or taxiway. Such information, which at a particular position in the flight corridor has the same value for all paths, should be given by means of signals which are the same for all flight paths and ground paths. These signals are given by radiation beams which are transverse to the full width of the flight corridor and the runway and taxiway. As the distances between beams will increase proportionally with the distance from the radiation source, the absolute distances can not be used for such information. However, the quotient of the distances between any two beams or two beams in a group of three beams can be arranged to be kept constant for all paths when the beams are parallel in a plane along the direction of flight. (The intersections with the plane being parallel). The magnitude of this quotient can correspond to the magnitude of the particular information. Therefore, the information can be derived in the aircraft by measuring the time intervals corresponding to said distances when the aircraft with constant speed passes through three "flat" transversely diverging beams parallel in a given plane which is substantially parallel to the direction of path. Constant path direction and relatively small angles between the beams are assumed. The magnitude of the said quotient can be changed from beam group to beam group thus giving another magnitude of the information in question. In a simple version the magnitude of the information can be linearly proportional to the quotient of the time elements, or more generally, the magnitude of the information can be derived uniquely from the quotient of the time elements through given mathematical formulas.

One particular piece of information which can be obtained with the aforementioned three beams is the altitude to a certain middle level in the flight corridor which could be called the reference altitude where the aircraft should preferably fly. As the aircraft approaches along the flight corridor this level should change according to the actual flight path level in relation to the distance of the aircraft from the runway. The new reference altitude could be obtained from three corresponding beams in a following group by arranging the angles between said three beams in such a way that the said quotient has the proper value in relation to the new reference altitude. When the identification of the beams is made the information can be obtained both on aircraft approach and "take off" through the flight corridor.

Different types of aircraft will preferably utilize different approach paths. Also, one aircraft will, in different flight situations, choose different flight paths because of change in the weight of the aircraft, wind, etc. Also, an aircraft will preferably select an approach path which is different from the "take off" path. These problems can be solved by different particular relationships between the given quotients and altitudes thereby obtaining the relevant reference altitudes for the particular case. This can be done by changing parameters in the mathematical formulas.

High and low altitude limits, within which the particular aircraft shall proceed, can also be given by a computer through a mathematical relationship to the reference altitude or separately by quotients from similar three beam arrangements.

For example in FIG. 17 the quotient $1/c$ of the flight path element will have a constant value for all flights independent of the height and lateral position. This quotient can be used to give particular information giving a middle height $H_0$ according to the following formula for the relationship:

$$H_0 = f(1/c)$$

and with constant ground speed:

$$H_0 = f(t_1/t_c)$$

where $t_1$ and $t_a$ are the corresponding time intervals. It might be simplified to $$H_0 = K \, 1/c \text{ (feet, or meters)}$$

where $K$ is a constant. With constant ground speed we get $$H_0 = K \, t_1/t_c$$

In a similar way further information necessary for all flights can be introduced, for instance, the distance to touch-down, or, to a particular important position in the flight operation. If we call the distance to this position $L$ and we look at FIG. 17, the quotient $c_1/d_1$ of the flight path elements $c_1$ and $d_1$ in the figure will be the same for all flight paths. It will then be possible to arrange that the distance L is a function of the said quotient, whereby:

$$L = f_2 (c_1/d_1) \text{ (feet, or meters)}$$

In a simplified version:

$$L = K (c/d) \text{ (feet, or meters)}$$

where $K$ is a constant. With the same supposition about constant speed we get $$L = f_2(t_{c_1}/t_{d_1}) \text{ (feet, or meters)}$$

and simplified $$L = K(t_{c_1}/t_{d_1}) \text{ (feet, or meters)}$$

It can be so arranged that the said distance is measured from a vertical beam perpendicular to the flight direction.

By means of this information from two different positions, for instance from two neighboring sources along the path, the distance between these sources will be obtained as a difference $(L_1 - L_2)$ between the distances to the particular position, and, when knowing the time interval the average ground speed can be calculated as:

$$\frac{(L_1 - L_2)}{t_{1-2}}.$$

Other information of importance which can be given in a similar way are:

1. the number of the particular approach corridor to the runway utilized,
2. the height of the particular source-collimator in relation to the runway level,
3. lateral displacement of a radiation source from the center line below the corridor of flight,
4. in the case of curved approach paths, the radius of curvature and direction of curvature, and
5. magnitude of obstacles.

In 2), 3), 4) and 5), there is, in addition to information about magnitude, also the question of plus or minus values; which in 2) is above (plus) or below (minus) the runway level; and in 3), 4) and 5) which direction is positive. This information can be arranged through the relationship of the information to the particular quotients of path elements. For example, referring again to FIG. 17, if the path elements are c and d for a particular information, and the information is obtained through the function $f(c/d)$, then in the design of the function relationship it can be so arranged that when $c/d$ is greater than a given quotient q then the value of the function indicates plus, or one particular direction in relation to the flight corridor, runway or taxiway, and when $c/d$ is less than the given value q the function indicates minus or the opposite direction and when $c/d$ is equal to $q$ there is no deviation, i.e. in 2), the position of the source-collimator is at the same level as the runway; in 3), no displacement of radiation source; in 4), no curvature of the approach paths; and in 5), no obstacles.

Identification through relative beam width can be obtained through variation in discreet values of the angular width of particular beams in relation to each other along any paths. This can be done because the relative width of beams along a direction will be the same with increasing distance to the source because the absolute width increases in the same proportion. As the width of beams in the present system is not utilized for giving other information the width can be utilized for code identification. There is then no need for very accurate measurement of beam widths. The beams can for instance be arranged with relative widths 1:2:4 in relation to each other and for identification purpose the accuracy in beam width measurement has only to be sufficient to reliably distinguish these widths from each other. Because it is comparatively easy to obtain this identification it is also possible to use relatively narrow beams in the flight direction. The width might for instance, in angular value, be arranged as ¼°, ½° and 1° when three different discreet widths are utilized.

Because each beam requires only a small fraction of the space in the air above the radiation source, it is possible to arrange multitudes of beams from each source.

Additional beams can be introduced into groups of beams as reference beams in such a way that the quotient of the distance between two beams and two of three beams has the same value along any path. This can be obtained by proper positioning of a third beam in relation to the two other given beams. Further, more than three beams can be arranged in fixed relative positions along the paths for the same purpose. One characteristic should be that all these beams should be parallel in a particular plane which is parallel to the direction of flight.

The sequence of information from the groups of beams or the beam pattern can be standardized according to rules arranged for the system. For example the groups of beams or the beam pattern can be designed so that in each particular interval only one particular beam will occur. If no beam, or, if two beams are detected by the aircraft in the particular interval, then the detection is erroneous and an error detecting unit should give an alarm signal.

Code identification can also be achieved by assigning radiation of different quality to particular beams. By use of gamma ray beams of different quantum energy, gamma ray detectors can be designed to discriminate between the different types of beams and thereby distinguish the particular beams. The same is also possible by the use of lightwaves or microwaves of different wavelengths.

It will also be possible to superpose coded groups of different types of beams on each other, each group assigned to give particular information. The code groups can be distinguished by detectors designed to discriminate between the different types of rays.

Figure 23:
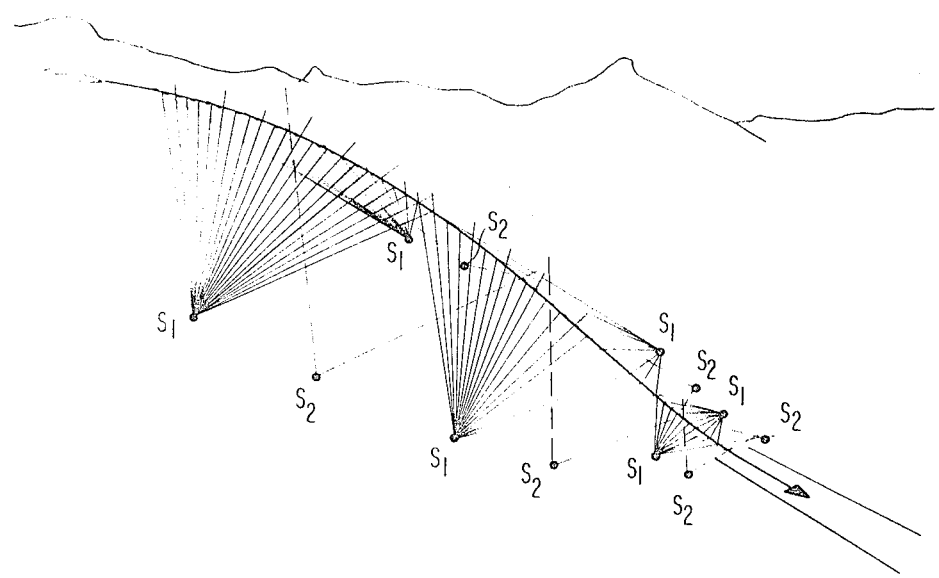
FIG. 23 is a diagrammatic perspective view showing the use of different types of radiation along the same section of the flight path.

FIG. 23 is a diagrammatic perspective view showing the use of different types of radiation along the same section of the flight path. Sources of a type $S_1$ alternate along each side with sources of a second type $S_2$.

Figure 18:
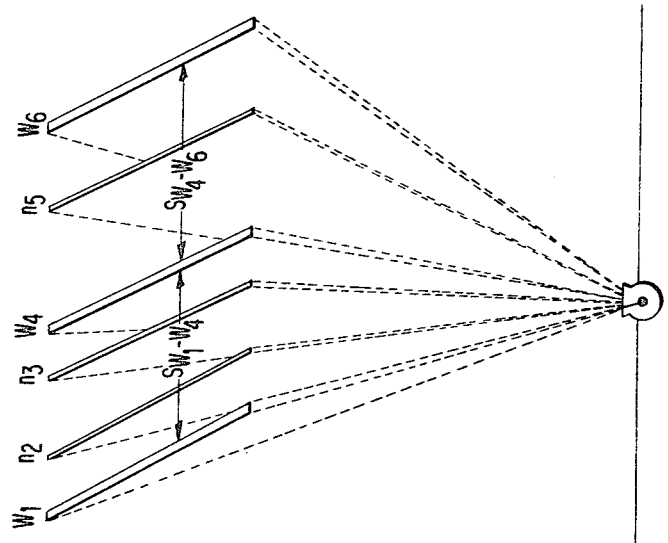
FIG. 18 is a diagrammatic perspective view of the radiation pattern showing the identification possibility through the sequence of wide and narrow beams and the fixed angular position of one recognition beam in relation to two other beams.

The importance of the first three of these code identification methods can be demonstrated by means of an example: FIG. 18. Assume a group of six beams from one radiation source. The beams have two different widths and the relative difference in width might be 1:2. The beams are arranged in the following sequence of narrow n and wide W beams: $W_1 n_2 n_3 W_4 n_5 W_6$. Further, the distance between $W_1$ and $W_4$ bears a constant relationship to the distance between $W_4$ and $W_6$ measured in the path direction. If particular information is allocated to be given through this particular group of beams, then the said sequence of wide W and narrow n beams will make the recognition of the group possible and thereby the decoding of the particular information. The recognition of the distance relationship between the wide beams $W_1 W_4$ and $W_6$ will be a confirmation of the identification. Anyone of these beams $W_1$, $W_4$ or $W_6$ could be regarded as a recognition beam in relation to the two others, for example $W_4$ could be placed in the particular position in relation to $W_1$ and $W_6$ for this purpose. The code can be made further identifiable, for example, by assigning the beam $n_2$ to occur within the first half of the interval between $W_1$ and $W_4$, and $n_3$ in the second half of the interval. If two beams, or no beam, are detected within the first or second half then the detection is erroneous and an error detecting electronic unit should give an alarm signal.

Figure 19B:
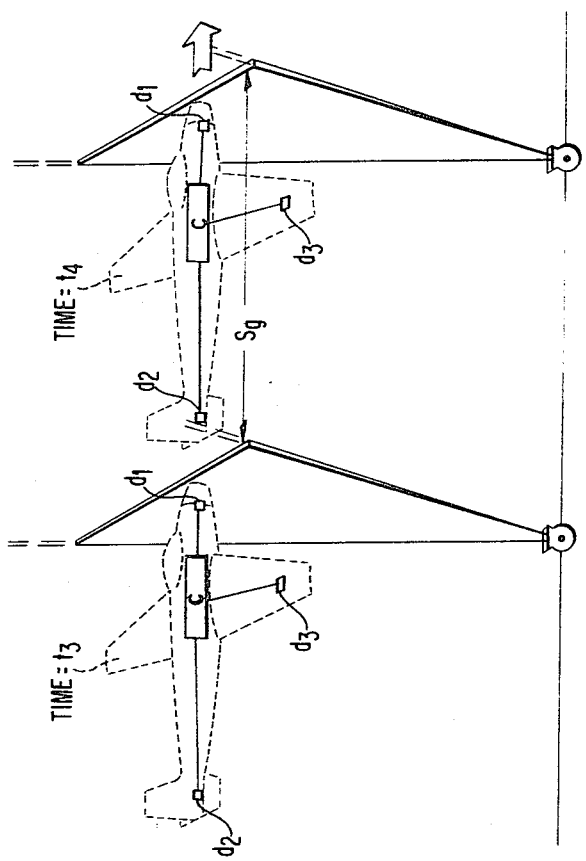
FIG. 19b is a diagrammatic perspective view showing two vertical parallel beams and an aircraft with a detector passing through the beams and thereby obtaining the ground speed.
Figure 19A:
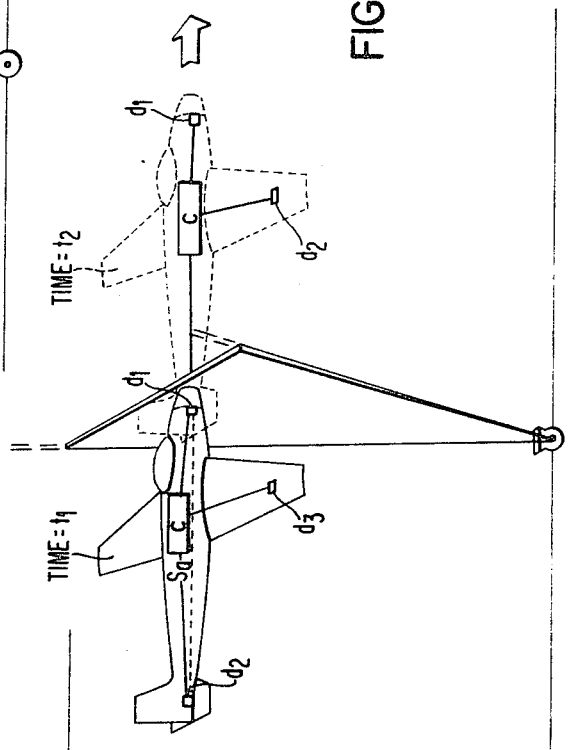
FIG. 19a is a diagrammatic perspective view showing an aircraft with two detectors, one in front and one in the rear, passing through one vertical beam thereby deriving the ground speed.
Figure 22:
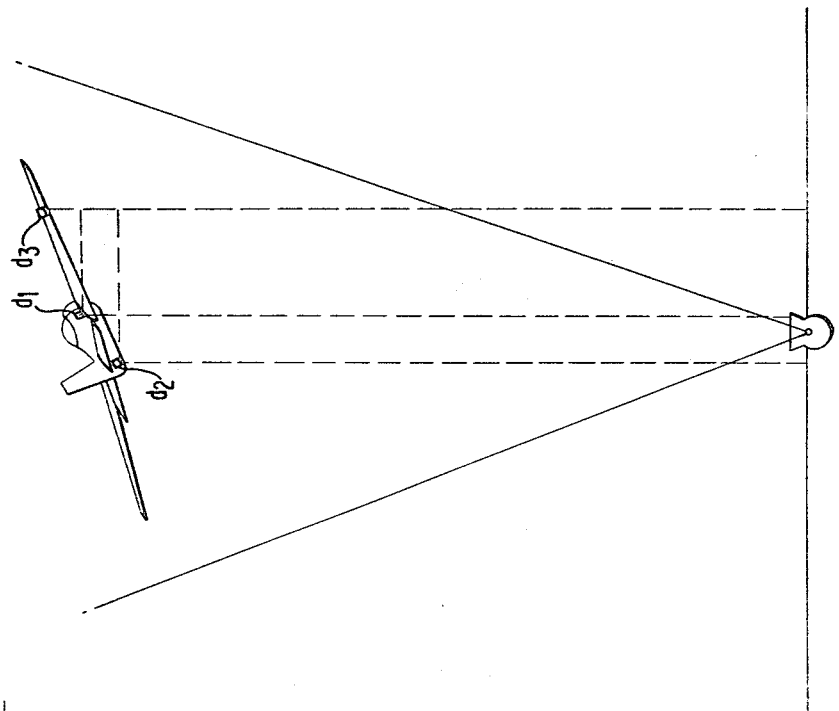
FIG. 22 is a diagrammatic perspective view of an aircraft with three detectors in the flight corridor, illustrating how the position determination of these detectors can be used for determining the attitude of the aircraft.

With one detector in the front $d_2$ and one in the rear of the aircraft $d_2$, and by measuring the time when the detectors pass through a vertical beam perpendicular to the flight paths, and knowing the distance between the detectors in the aircraft the ground speed can be obtained by this distance divided by the time interval in computing means c FIG. 19a and b. As mentioned earlier, the position information obtained in the system is the position of the detectors in the aircraft. With one detector in the front and one in the rear, the positions of the two detectors in the air, derived from the beampattern as earlier explained, will give the information of the attitude of the main axis of the aircraft in relation to the path and the so-called pitch and heading of the aircraft. With one additional detector $d_3$ to the side of these detectors the roll-angle will be obtained in computing means c and thereby the full attitude of the aircraft. FIG. 22 is a diagrammatic perspective view of an aircraft with three detectors in the flight corridor, illustrating how the position determination of these detectors can be used for determining the attitude of the aircraft.

What is described above concerns ordinary aircraft landing at relatively high speeds and reducing their landing velocity relatively moderately in the approach corridor. During passage through that part of a flight corridor formed by one pair of radiation sources, the flight velocity may therefore be regarded as constant. Calculations can therefore be made without correcting for changes of velocity.

The position is different for helicopters or VTOL and STOL aircraft (i.e. aircraft starting and landing vertically or along a steep path). Such aircraft enter the guidance system with a certain velocity which decreases gradually to nil or a low speed at the point of landing. Their flight paths are also steeper and, therefore, shorter as seen from a certain altitude. In constructing a guidance system for landing such aircraft it is necessary to take into account that the retardation within one signal is of such value that it cannot be disregarded when the radiation pattern and/or the coding equipment are constructed. The distance between the respective signals along the flight path may be arranged in such a way that, at a given velocity retardation rate within a signal, the time interval relations are the same as at constant speed in a corresponding path of the above described landing system. If the system is arranged in this way the same electronic decoding equipment may be used as for other aircraft and it will be possible to check whether the aircraft is landing with the desired velocity retardation rate, the particular beams giving the "scale" of the pattern (the reference beams) serving to indicate deviations from the correct rate.

The electronic decoding equipment may also be programmed for certain velocity retardation functions along the flight path. In the programming one may for example take into consideration the reference beams, the position of which in the signal is relatively independent of arbitrary deviation from the desired flight path. Programming may also be adapted to the velocity retardation function of different aircraft to indicate to the pilot or autopilot deviations from the correct velocity and retardation.

In the arrangement as described above, the radiation pattern consists of beams which are substantially "flat" and are located substantially transversely to the flight direction. An aircraft will, therefore, rapidly pass through the beams, and there will be a relatively great distance between the beams as seen in relation to the width of the beams in the flight direction. If, by accident, an aircraft should be thrown out of the flight corridor it would be of importance that the pilot immediately is given a corresponding alarm signal. Such alarm signals may be obtained by means of continuous beams defining the flight corridor in the flight direction in the following way:

When moving out of the corridor, the aircraft will pass the border zone and its radiation detector will be influenced upon by radiation of long duration, several times the duration of such influences during the passage within the corridor. There may easily be arranged alarm signals in the detector equipment by separating said long-lasting influences from the short-lasting ones.

It may also be of interest to obtain extra information about the extent of deviation from a correct flight path within the flight corridor. This may be obtained by arranging an extra radiation pattern within the corridor, which divides the corridor into narrow channels, similar to the previously mentioned division, see FIG. 1. Thereby is obtained indication of the channels by beams which are of practically constant radiation intensity in the direction of the flight path and having their greatest radiation intensity at the channel borders, an intensity which decreases towards nil at the middle line of each of said channels. For convenience these beams may have lower radiation intensity than those which form part of the code pattern, so that it may be easy to distinguish the two types of radiation.

What is claimed is:

1. A system for generating beams of radiation defining a flight corridor and flight paths within said corridor comprising; first and second radiation generation means for generating a first and second plurality of flat diverging collimated radiation beams which are shaped to intersect different deviation flight paths within said corridor with unique combinations of said first plurality of beams; said first and second plurality of beams being positioned so that said beams intersect said corridor but not each other, wherein said first and second generating means generate additional pluralities of flat collimated radiation beams, each of said pluralities being the same with respect to flight path intersections within said corridor, and, wherein said first generating means comprises a first source of radiation having a mask which forms said radiation into flat collimated beams, said mask having a periodic pattern to cause the formation of corresponding groups of beams within each of said plurality of beams, and said second generating means comprises a second source of radiation having a mask which forms said radiation into flat collimated beams, said mask having a periodic pattern to cause the formation of the remaining corresponding groups of beams within each of said plurality of beams; said first and second sources being located on opposite sides of an imaginary plane which is parallel to said flight paths and substantially perpendicular to the earth.

2. The system claimed in claim 1 further comprising additional pairs of radiation sources placed on opposite sides of said imaginary plane along a direction of said desired flight path and forming radiation beam patterns substantially similar to that formed by said first and second sources, said additional pairs positioned to direct flat diverging beams toward said desired flight path and transverse thereto at angles with respect to the earth which decrease in a direction along said flight path.

3. A system as claimed in claim 2 wherein said additional pairs are positioned at decreasing distances from pair to pair in the direction of said flight path.

4. A system as claimed in claim 3 further comprising means for generating a pair of non-diverging parallel flat radiation beams positioned one behind the other and in front of said pluralities of diverging beams with respect to the direction of said flight path, whereby the relative distance between said non-diverging beams and said first pair of diverging collimated flat beams along any given flight path within said corridor is an indication of the altitude of said given flight path.

5. The system as claimed in claim 4 further comprising:
a. means for generating a beam of radiation in a direction parallel to said flight path and directed from the ground upwards on the right-hand side of said corridor defining the right-hand lateral edge of said corridor, and
b. means for generating a beam of radiation in a direction parallel to said flight path and directed from the ground upwards on the left-hand side of said corridor defining the left-hand lateral edge of said corridor.

6. A system for generating beams of radiation defining a flight corridor and a desired flight path within said corridor comprising:
a. a first source of radiation placed on one side of an imaginary plane which includes said desired flight path and intersects the earth substantially perpendicularly,
b. a second source of radiation placed on the opposite side of said imaginary plane with respect to said first source,
c. a first masking means in combination with said first source of radiation for generating repeated first groups of collimated flat radiation beams transversely intersecting said desired flight path, each of said first groups including first and second parallel diverging beams and a third diverging beam directed angularly within a horizontal plane with respect to said first and second beams whereby the relative distance between said first and second beams and said second and third beams measured along any given flight path in said corridor is an indication of the angular position of said flight path with respect to said first source,
d. a second masking means in combination with said second source of radiation for generating a repeated second group of collimated flat radiation beams transversely intersecting said desired flight path, each of said second groups including diverging flat collimated beams one of which is parallel in a horizontal plane to the parallel beams in said first group and the other of which is angular in a horizontal plane to said parallel beam whereby the relative distance between any two parallel beams and said beams in said second group measured along any given flight path in said corridor is an indication of the angular position of said flight path with respect to said second source,
e. the combination of relative distances between adjacent first and second groups of beams being unique for every flight path within said corridor, said adjacent first and second groups forming a code group of beams.

7. The system as claimed in claim 6 further comprising:
a. a plurality of additional pairs of radiation sources, said additional pairs being spaced along the ground in the direction of said flight path, and
b. masking means associated with each additional pair of sources for generating a pattern of flat collimated radiation beams which intersect said corridor to form code groups of beams substantially identical to the code groups formed by said first pair of sources.

8. The system as claimed in claim 7 wherein the first beam generated by each pair of radiation sources has a width which is a substantial deviation from the width of the other generated beams.

9. The system as claimed in claim 8 further comprising:
a. means associated with each pair of radiation sources for generating a pair of non-diverging parallel collimated flat radiation beams transverse to said desired flight path, whereby the time between intersection by an aircraft traveling in said corridor of said pair of non-diverging beams is an indication of aircraft ground velocity.

10. The system as claimed in claim 9 wherein said patterns generated by said pairs of radiation sources have an overall dimension in the direction of said desired flight path which decreases with each of said pairs in a direction towards a desired landing point, said dimensions of any pattern being proportional to the desired velocity of an aircraft flying through said corridor at the time it intersects a given pattern.

11. The system as claimed in claim 10 comprising:
a. means for generating a beam of radiation in a direction parallel to said flight path and directed from the group upwards on the right-hand side of said corridor defining the right-hand lateral edge of said corridor, and
b. means for generating a beam of radiation in a direction parallel to said flight path and directed from the group upwards on the left-hand side of said corridor defining the left-hand lateral edge of said corridor.

12. A system for defining flight paths within a flight corridor comprising, first and second sources of radiation positioned on opposite sides of said corridor to direct radiation which crosses said corridor transverse to said flight paths, masking means placed on said radiation sources for confining the radiation in said corridor into at least one coded group of flat collimated diverging beams, said masks being configured to provide within said coded group at least a pair of flat collimated diverging beams which are parallel in a horizontal plane and at least one flat collimated diverging beam from each of said sources which is disposed angularly within a horizontal plane with respect to said parallel beams, whereby the relative distances between said parallel beams, any parallel beam and the angular beam from said first source and any parallel beam and the angular beam from said second source are unique for every flight path within said corridor.

13. A system as claimed in claim 12 wherein said masks are configured to provide a plurality of said coded groups of beams positioned one behind the other in a direction parallel to said flight paths.

14. A system as claimed in claim 13 wherein said masks are configured to cause the first beam within each coded group to have a width which is a substantial deviation from the width of the other generated beams.

15. A system as claimed in claim 13 further comprising additional pairs of radiation sources, each pair being masked in a manner substantially identical to said first pair of radiation sources, each of said additional pairs being positioned along said corridor displaced from all other pairs to intersect said corridor with the coded groups of beams from said pair whereby a given flight path throughout the entire corridor intersects each coded group at the same combination of relative distances between beams.

16. A system as claimed in claim 15 wherein said masks are configured to cause the first beam within each coded group to have a width which is a substantial deviation from the width of the other generated beams.

17. A system as claimed in claim 16 wherein said radiation is gamma radiation.

18. A system for generating beams of radiation giving information and defining paths for an aircraft in a flight corridor and along a runway and taxiway comprising a plurality of radiation means positioned on the ground and axially aligned with said paths wherein each of said radiation means comprises a source of radiation, a first means for deriving from said source a first plurality of collimated diverging radiation beams, said first plurality of radiation beams being shaped to intersect said paths transversely such that the pattern formed by the intersection with each of said paths is different and additional means for deriving from said source additional pluralities of collimated diverging radiation beams wherein the pattern formed by the intersection of each of said additional plurality of beams with each flight path is the same as the pattern formed by said first plurality.

19. The system of claim 18 wherein said first means and said additional means for deriving from said source said pluralities of beams comprises a mask means over said source.

20. The system as claimed in claim 18 wherein said radiation means is located in axial alignment with the center of said flight corridor, runway and taxiway.

21. The system as claimed in claim 18 wherein said radiation means is located axially aligned with and to the side of said flight corridor runway and taxiway.

22. The system claimed in claim 19 further comprising additional radiation means located at the ground along the flight corridor, runway and taxiway, said additional radiation means having masking means for deriving pluralities of collimated diverging beams which do not intersect each other and which form repeated patterns along said path.

23. The system as claimed in claim 22 further arranged so that said pluralities of radiation beams forming said patterns of radiation beams contain coded information through the absolute and relative distances between the said beams and identified by the absolute and relative width of the beams measured along the flight path, whereby information is obtained therefrom.

24. A system as claimed in claim 19 wherein said pluralities of collimated diverging beams contain a first and a second flat collimated diverging beam which are parallel in a horizontal plane and transverse to the direction of flight, the distance between said beams in the direction of flight being proportional to the altitude in relation to the level of said radiation means, whereby the altitude both in the landing operation as well as "take-off" operation by multiplication of a time interval with the ground speed aircraft and a constant factor dependent on the given angle between the first and second beam can be calculated.

25. A system as claimed in claim 24 wherein said pluralities of flat collimated diverging beams have a third diverging beam directed angularly within a horizontal plane with respect to said first and second beams whereby the relative distance between said first and second beams and said second and third beams measured along any of said paths is an indication of the lateral angular position of said path with respect to said radiation means and a detector in the aircraft, passing with constant speed along said path, by detecting the corresponding time intervals between said beams will get the lateral angular position of the detector in the aircraft with respect to said radiation means and the level of the source, which together with the altitude gives the absolute position of the aircraft.

26. A system as claimed in claim 25 comprising pluralities of collimated flat diverging radiation beams transversely intersecting said flight paths each of said pluralities including a first, second and third diverging beam all said beams being parallel in a particular plane along the flight direction whereby assuming substantially constant ground speed and flight direction of the aircraft when passing through the said beams, in any given flight path, the quotient of the distances between the said first and second beam and the said second and third beam will be substantially the same and can be used to give information to the aircraft about the altitude to a predetermined level which might be a middle reference level; and by changing the quotient of corresponding radiation beams in the next plurality of said pluralities of beams, a new altitude for the said reference level will be obtained according to desired change in corridor reference level along the flight corridor.

27. A system as claimed in claim 26 wherein said first, second and third diverging beams are parallel in a horizontal plane.

28. A system as claimed in claim 26 wherein said quotients indicate levels above or below which the aircraft should preferentially fly.

29. A system as claimed in claim 26 wherein the quotient of distances between the said first and second beam and the said second and third beam being substantially the same in any given path, the quotient can be used to give information to the aircraft about the distance from one vertical beam perpendicular in relation to the said paths and to the threshold of the runway and any other desired reference point in the flight corridor, runway and taxiway.

30. A system as claimed in claim 29 wherein similar quotients can be used to give information to the aircraft about the magnitude of a characteristic in the system, as:
   a. the height of the site of the radiation source in relation to runway level,
   b. the lateral displacement of the site of the radiation source in relation to a middle point underneath the flight paths,
   c. the number of the approach corridor, runway and taxiway,
   d. the radius of curvature and direction of curvature for curved approach paths, and
   e. magnitude of obstacles.

31. A system as claimed in claim 29 wherein the aircraft, when obtaining the information about the distances to a reference point from two different perpendicular vertical beams and the time interval between the passage of the said beams can derive the average ground speed.

32. A system as claimed in claim 19 wherein each plurality of collimated diverging beams contain one first and one second flat collimated diverging beam, said two diverging beams arranged so that the said beams are parallel in a given plane and knowing the ground speed of the aircraft for any chosen path through the beams the time intervals between passage of the said first and second beams are proportional to the distance from a plane through the radiation means parallel with the said given plane and to the position of the path element of the path between the said two diverging beams.

33. A system as claimed in claim 24 wherein said masking means varies the angular width of particular beams in discrete values in relation to each other along any of said paths for obtaining identification of the particular beams.

34. A system as claimed in claim 24 wherein additional particular radiation beams are positioned in a reference position to at least two particular radiation beams in such a way that the relative distances between one of said additional particular radiation beams and any two of said particular radiation beams are the same along all the said paths and said additional particular beams can be used as reference beams in relation to the other beams in said pluralities of beams thereby improving the reliability of code identification when passing along any path inside the said flight corridor and on the said runway and taxiway.

35. A system as claimed in claim 24 wherein the additional pluralities of collimated radiation beams and the beam pattern of said groups of beams is arranged for a given lay-out in a certain sequence along the flight path thereby improving the reliability of code identification when passing along any path inside the said flight corridor and on said runway and taxiway in landing as well as "take off" operations.

36. A system as claimed in claim 18 wherein the collimated diverging beams of radiation are gamma rays from radioactive sources.

37. A system as claimed in claim 18 wherein the collimated diverging beams of radiation are X-rays from X-ray equipment.

38. A system as claimed in claim 18 wherein the collimated diverging beams of radiation are untraviolet.

39. A system as claimed in claim 18 wherein the collimated diverging beams of radiation are visual rays.

40. A system as claimed in claim 18 wherein the collimated diverging beams of radiation are infrared rays.

41. A system as claimed in claim 18 wherein the collimated diverging beams of radiation are radiowaves preferably in the range of microwaves.

42. A system as claimed in claim 18 wherein collimated diverging beams of radiation of different types are used in different parts of the system and parallel along the same part of the system whereby means of a detector which can discriminate between the different types of rays and detect them separately, the signals from the different beams of radiation can be detected separately.

43. A system as claimed in claim 19 wherein a first beam detector is positioned in the front and a second beam detector in the rear of the aircraft so that the time interval of passage of the two said detectors through a vertical beam can be measured, and knowing the distance between said detectors, the ground speed is obtained as said distance divided by the time interval.

44. A system as claimed in claim 19 wherein a first beam detector is positioned in the front and a second beam detector in the rear of an aircraft in flight and obtaining the information of the positions of the paths of said detectors the attitude of the main axis of the said aircraft in relation to the flight corridor and thereby the so-called pitch and heading of the aircraft will be derived, and by means of a third detector positioned to the side of the axis of said first and second detectors the roll-angle will be derived and thereby the full attitude of the aircraft.

45. A system as claimed in claim 44 wherein collimated diverging beams of radiation of different types are used in different parts of the system and parallel along the same part of the system whereby means of at least detectors, each sensitive for a particular type of rays, the signals from the different beams of radiation can be detected separately.

* * * * *